Aug. 19, 1952    R. F. DERY    2,607,124
ADJUSTABLE GAUGE BLOCK
Filed Sept. 19, 1949
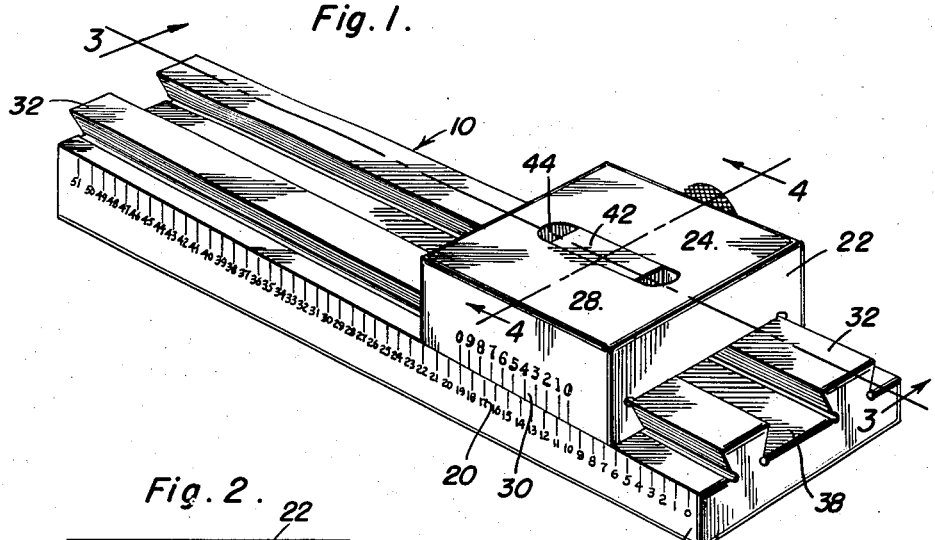
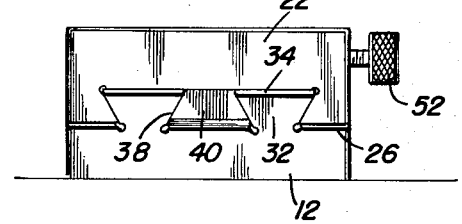
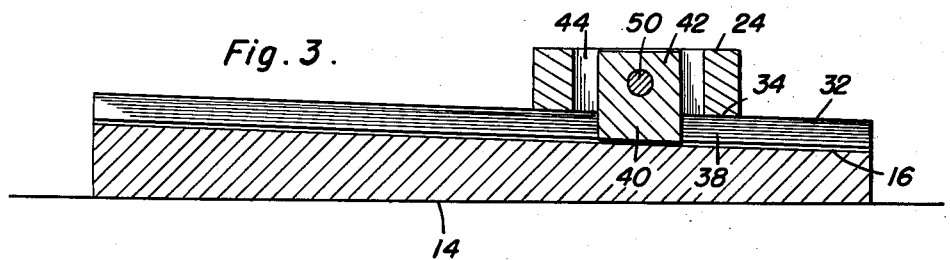
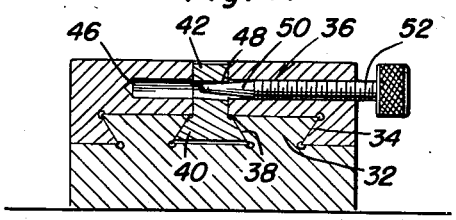
Roland F. Dery
INVENTOR.

Patented Aug. 19, 1952

2,607,124

UNITED STATES PATENT OFFICE 2,607,124

ADJUSTABLE GAUGE BLOCK

Roland F. Dery, Pine Meadow, Conn.

Application September 19, 1949, Serial No. 116,525

1 Claim. (Cl. 33—162)

This invention relates to novel improvements in a gauge block or measuring tool which is employed by machinists for measuring heights on lathes, planers, and similar machines, and for similar purposes.

The primary object of this invention is to provide improved means for slidably mounting the gauge block on a base member and improved means for locking the gauge block in selected positions on the base member.

Another important object of this invention is to provide a simple and durable gauge for measuring fractions of thousandths of an inch in an accurate and dependable manner, the gauge being easily operated.

These and ancillary objects and structural features of merit are attained by this invention, the preferred embodiment of which is set forth in the following description and illustrated in the accompanying drawings, wherein:

Figure 1 is a view in perspective of a preferred embodiment of this invention;

Figure 2 is an end elevational view;

Figure 3 is a longitudinal vertical sectional view taken on line 3—3 of Figure 1; and Figure 4 is a transverse sectional view taken on line 4—4 of Figure 1.

Referring now more particularly to the drawing, the improved gauge 10 includes a base member 12, which is longitudinally wedge-shaped, being formed with a straight or plane bottom surface 14 and a beveled top or upper surface 16, the upper surface being inclined longitudinally relative to the plane bottom surface. The bottom surface of the base and the top surface are connected by straight vertical side walls 18, a scale 20 being formed on the upper portion of the side walls, adjacent the upper surface. The scale is formed with various divisions per inch, depending upon the rise of the upper surface.

A gauge block 22 is slidably disposed on the base and is formed with a plane upper surface 24 disposed in parallelism with the lower surface 14 of the base and an inclined bottom surface 26, which slidably contacts the upper surface of the base. The bottom surface 26 of the block is inclined in an opposite longitudinal direction from the inclined upper surface or face of the base, so that the opposed faces or surfaces of the base and block are parallel, as seen in Figure 3. The block is formed with straight vertical side walls 28 having a scale 30, complementary to the scale 20, formed on the lower portion thereof. The walls 28 of the block and the walls 20 of the base are coplanar, as seen in Figure 2.

Means are provided for slidably mounting the block on the upper face or surface of the base, and preferably includes forming an integral, longitudinally extending and coextensive dovetail head 32 on the upper surface 16 of the base. The dovetail head is disposed parallel with the upper surface 16 and is coextensive with the base member. The block is formed on its under side or in the bottom surface with a longitudinally extending dovetail slot 34, complementary to the dovetail head 32, and slidably disposed thereon.

Means are provided for locking the block in selected positions on the base. The means, generally designated by the numeral 36, includes a longitudinally extending dovetail slot 38, which is centrally formed in the dovetail head 32 of the base. A dovetail head 40 is slidably disposed in the slot 38 and is formed with an upper straight end 42 inserted in a vertical opening 44 formed in the block. A transverse opening 46 is drilled and bored through the block, adjacent the upper surface 24 and transversely communicates with the vertical opening 44. The upper portion 42 of the head 40 is formed with a tapered, transversely disposed opening 48 within which the inner smooth surfaced tapered end 50 of a screw or similar member 52 is adapted to seat. The screw 52 extends transversely in the block and is threadingly disposed in the opening 46. Thus, rotation or inward movement of the screw 52 forces the inner end 50 into wedging engagement in the opening 48 and causes the head 40 to be vertically raised and brought into frictional engagement of the side walls of the dovetail slot 38 in the base. The block is thus locked on the base.

Of course, square guides and openings may be substituted for the dovetail connections between the block and base. Thus, since various changes may be resorted to, limitation is only sought in accordance with the appended claim.

Having described the invention, what is claimed as new is:

A gauge comprising an elongated wedge-shaped base and a wedge-shaped block slidably mounted thereon with the opposing faces of the base and block disposed in parallelism and the contacting faces inclined in opposite longitudinal directions, scales formed on adjacent sides of said base and said block, a guide member formed on the inclined face of the base, the inclined face of the block having a groove for slidably receiving the member, said member having a longitudinal dovetail slot therein, a dovetail head carried by the block disposed in said slot, said head having a tapered transverse opening formed in its upper portion, a stud disposed transversely through and threadedly engaging the block and having a tapered inner end complementary to the tapered opening for moving the head upwardly into frictional locking engagement of the slot as the stud is moved inwardly of the block.

ROLAND F. DERY.

REFERENCES CITED

The following references are of record in the file of this patent:

UNITED STATES PATENTS

| Number | Name | Date |
|---|---|---|
| 833,598 | Hansen | Oct. 16, 1906 |
| 2,219,180 | Fichter | Oct. 22, 1940 |
| 2,400,441 | Sconce | May 14, 1946 |
| 2,471,684 | Hastings | May 31, 1949 |